United States Patent
Yee et al.

(10) Patent No.: US 6,754,760 B1
(45) Date of Patent: Jun. 22, 2004

(54) PROGRAMMABLE INTERFACE FOR A CONFIGURABLE SYSTEM BUS

(75) Inventors: Wilson Yee, Pleasanton, CA (US); Brian Fox, Sunnyvale, CA (US); Sridhar Krishnamurthy, San Jose, CA (US); Bart Reynolds, Seattle, WA (US); Steven Winegarden, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 375 days.

(21) Appl. No.: 09/644,223

(22) Filed: Aug. 21, 2000

(51) Int. Cl.⁷ .............................. G06F 13/40; G06F 3/00
(52) U.S. Cl. ........................................ 710/307; 710/11
(58) Field of Search ...................... 710/11, 14, 305–307

(56) References Cited

U.S. PATENT DOCUMENTS

| | | | |
|---|---|---|---|
| RE34,363 E | | 8/1993 | Freeman |
| 5,369,314 A | | 11/1994 | Patel et al. |
| 5,394,528 A | * | 2/1995 | Kobayashi et al. ......... 710/307 |
| 5,402,014 A | | 3/1995 | Ziklik et al. |
| 5,423,009 A | * | 6/1995 | Zhu ............................ 710/307 |
| 5,448,493 A | | 9/1995 | Topolewski et al. |
| 5,504,875 A | * | 4/1996 | Mills et al. ................. 711/171 |
| 5,515,507 A | * | 5/1996 | Byers et al. .................. 714/56 |
| 5,603,041 A | * | 2/1997 | Carpenter et al. .......... 710/307 |
| 5,651,138 A | | 7/1997 | Le et al. |
| 5,715,205 A | * | 2/1998 | Sywyk ......................... 365/219 |
| 5,729,764 A | * | 3/1998 | Sato ............................. 710/52 |
| 5,774,684 A | | 6/1998 | Haines et al. |
| 5,844,854 A | | 12/1998 | Lee |
| 5,883,525 A | | 3/1999 | Tavana et al. |
| 5,930,484 A | * | 7/1999 | Tran et al. .................. 710/107 |
| 5,963,050 A | | 10/1999 | Young et al. |
| 6,047,347 A | * | 4/2000 | Hansen et al. .............. 710/307 |
| 6,085,317 A | | 7/2000 | Smith |
| 6,467,009 B1 | | 10/2002 | Winegarden et al. |

OTHER PUBLICATIONS

"Triscend E5 Configurable System–on Chip," Triscend Corporation, 301 N. Whisman Road, Mountain View, CA 94043, www.triscend.com (dated before Aug. 21, 2000).

"Configurable System Interconnect (CSI) Bus User's Guide, Version 1.0," Triscend Corporation, 301 N. Whisman Road, Mountain View, CA 94043, www.triscend.com (Aug. 1999).

* cited by examiner

*Primary Examiner*—Glenn A. Auve
*Assistant Examiner*—Trisha Vu
(74) *Attorney, Agent, or Firm*—Mark L. Watson; Kim Kanzaki; Justin Liu

(57) ABSTRACT

Interface logic is disclosed. The interface logic comprises a first address decoder, a first set of mode logic coupled to the address decoder and a first selector coupled to the first set of mode logic. The interface logic is adaptable to connect the programmable logic to the system interconnect via one of a plurality of access modes supported by the system interconnect.

20 Claims, 4 Drawing Sheets

PROGRAMMABLE INTERFACE FOR A CONFIGURABLE SYSTEM BUS

FIELD OF THE INVENTION

The present invention relates to integrated circuits, and more specifically, to interfacing configurable system logic with a configurable system bus.

BACKGROUND

Configurable processor system units (CPSUs) typically integrate a central processing unit (CPU), an internal system bus, programmable logic and various system resources that are interconnected and communicate via the system bus. In many systems, a byte (e.g., 8-bits) is considered to be the basic unit for data transfers. Typically, higher performance systems utilize a 32-bit or wider bus to improve data bandwidth. However, most systems include devices that only support a one or two byte-wide interface.

In the past, system designers have relied upon different operating modes of the system bus to allow simple connections to narrower interfaces. For example, many 32-bit wide busses have special 8-bit and 16-bit access modes. However, when developing programmable logic for a system bus that supports various operating modes, designers typically have to design their own hardwired interface to the bus. Having to design a separate interface for each programmable logic application is not efficient since it often requires additional time and expense. Therefore what is desired is a programmable interface that is capable of connecting programmable logic to a system bus that operates according to a plurality of operation modes.

SUMMARY

According to one embodiment, a system is disclosed. The system includes a system interconnect, programmable logic and interface logic coupled to the system interconnect and the programmable logic. The interface logic is adaptable to connect the programmable logic to the system interconnect via one of a plurality of access modes supported by the system interconnect.

Other features and advantages of the present invention will be apparent from the accompanying drawings and from the detailed description that follows below.

BRIEF DESCRIPTION OF THE DRAWINGS

The present invention is illustrated by way of example and not limited in the figures of the accompanying drawings, in which like references indicate similar elements, and in which.

DETAILED DESCRIPTION

Figure 1:
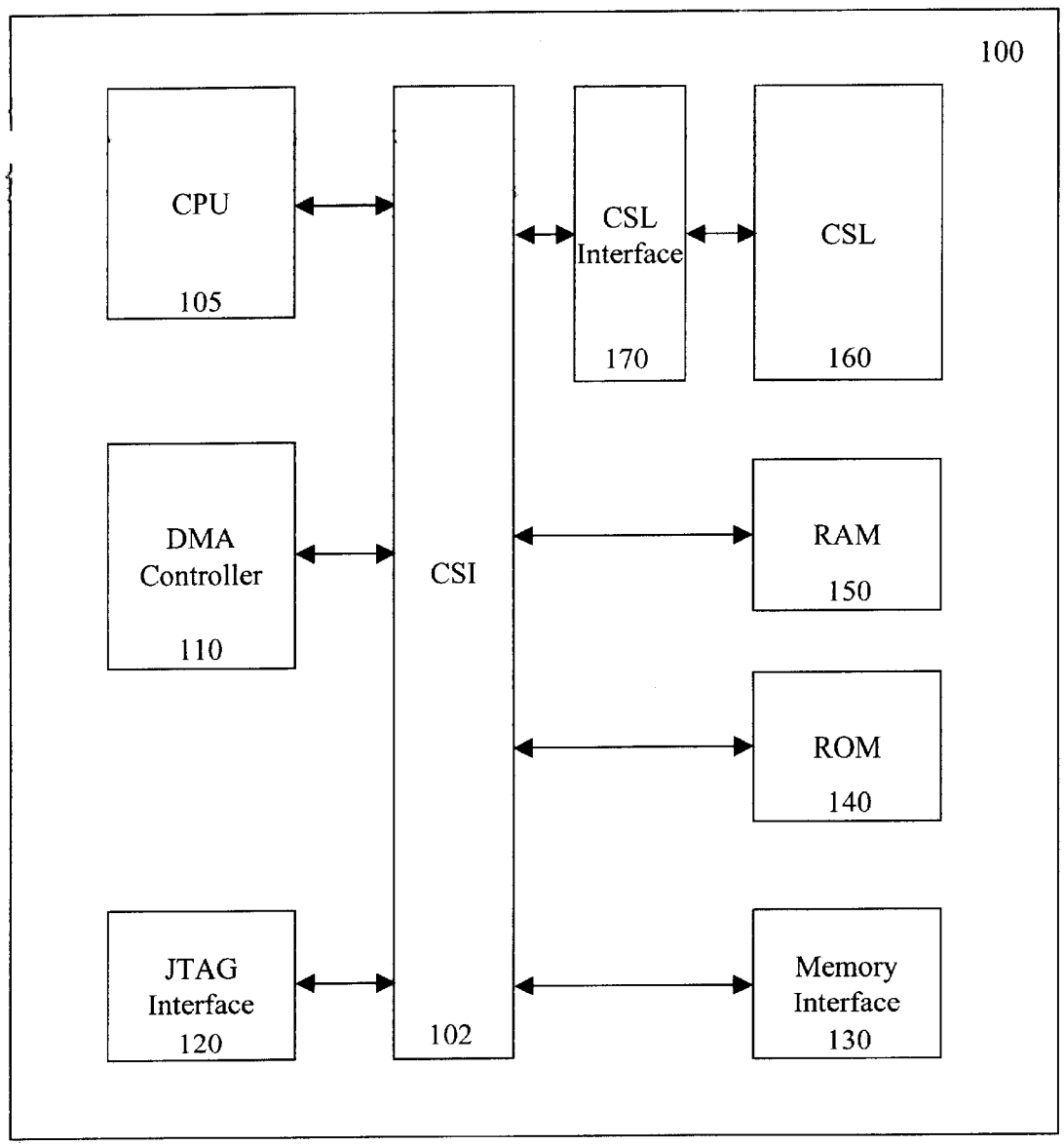
FIG. 1 is a block diagram of one embodiment of a system.

FIG. 1 is a block diagram of one embodiment of a system 100. System 100 includes a configurable system interconnect (CSI) 102, a central processing unit (CPU) 105, a direct memory access (DMA) controller 110 and a Joint Test Action Group (JTAG) interface 120. In addition, system 100 includes a memory interface 130, a read only memory (ROM), a random access memory (RAM), configurable system logic (CSL) 160 and a CSL interface 170. According to one embodiment, the components of system 100 are all included on the same semiconductor chip.

CSI 102 is a dedicated system bus for connecting CPU 105 to the other components within system 100. In addition, CSI 102 provides a synchronous interface for system 100 components. Further, CSI 102 includes address and data paths, a clock and control signals. According to one embodiment, CSI 102 is a 32-bit bus that supports multiple access modes. In such an embodiment, devices in system 100 may be configured to transmit 32-bit, 16-bit or 8-bit packets of data via CSI 102.

CPU 105 is coupled to CSI 102 and executes sequences of instructions received from other components within system 100. According to one embodiment, CPU 105 is an ARM7TDMI processor developed by ARM of Cambridge, Mass. Alternatively, other processors may be used.

DMA controller 110 is coupled to CSI 102 and controls direct memory accesses between memory devices within system 100 (e.g., RAM 150 and ROM 140) without using CPU 105. JTAG interface 120 is adaptable to test the boundaries of system 100. According to one embodiment, JTAG interface 120 operates as a master device of CSI 102 and has access to all system resources in order to debug system 100. In a further embodiment, JTAG interface 120 converts serial bit streams into parallel registers whose contents are placed on the address, data and command busses in order to emulate CSI 102 transactions.

Memory interface 130 provides a connection between CSI 102 and one or more external memory devices (not shown). ROM 140 is also coupled to CSI 102. ROM 140 is used to initialize system 100 upon startup. In addition, ROM 140 provides instructions and data used to configure CSL 160. Further, ROM 140 may be configured to instruct CPU 102 to fetch and execute code segments from external memory devices and other interfaces. One of ordinary skill in the art will appreciate that other non-volatile memory devices (e.g., flash memory) may be used instead of a ROM.

RAM 140 stores sequences of instructions that are executed by CPU 105. CSL 160 includes programmable logic that is coupled to CPU 105, RAM 150 and other system 100 device components via CSI 102. According to one embodiment, CSL 160 includes a matrix of programmable logic tiles that correspond to design units of the physical layout of CSL 160. CSL 160 may be used to implement various device components such as registers, memories, etc.

Figure 2:
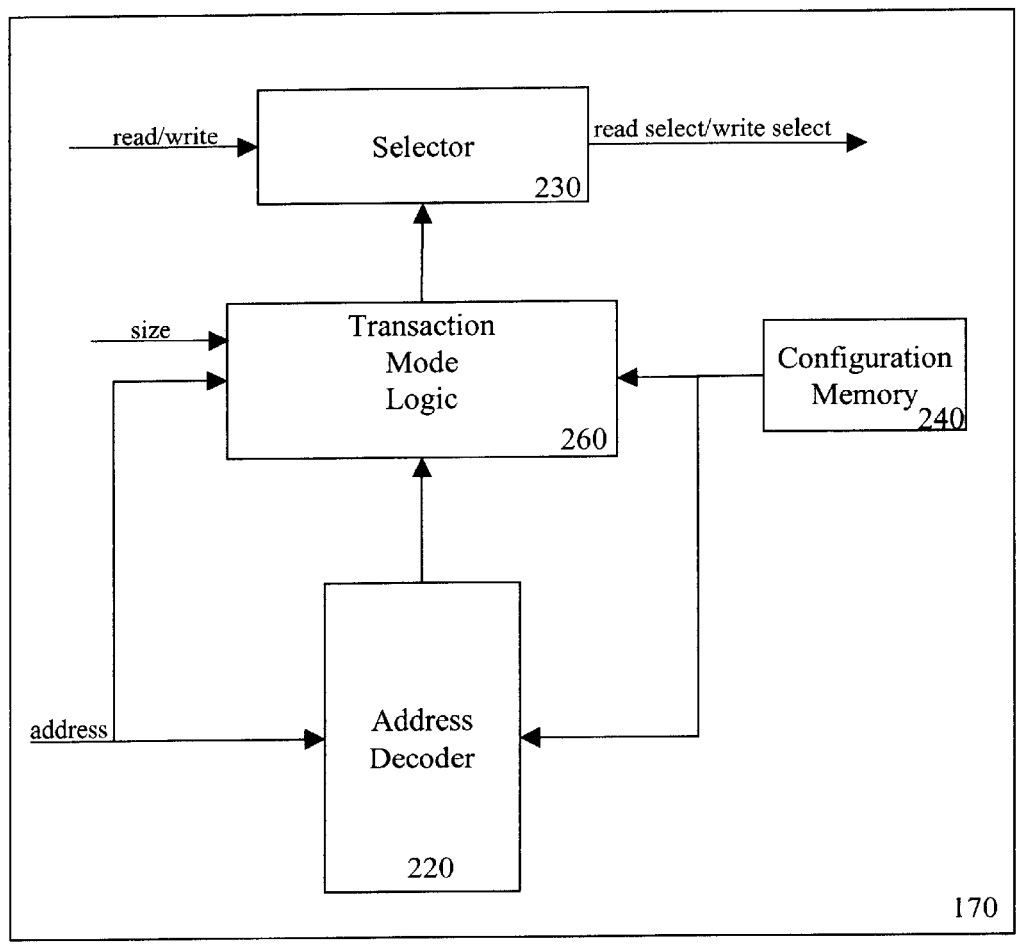
FIG. 2 is a block diagram of one embodiment of a configurable system logic interface.

CSL interface 170 is coupled to CSI 102 and CSL 160. Interface 170 includes circuitry for handling the distribution and collection of system signals such as CSI 102 bus signals. According to one embodiment, interface 170 includes high performance address decoding in order to simplify logic within CSL 160 required to build interface functions. FIG. 2 is a block diagram of one embodiment of CSL interface 170.

Referring to FIG. 2, interface 170 includes an address decoder 220, selector 230, configuration memory 240 and transaction mode logic 260. Mode logic 260 permits CSL 160 to interface with CSI 102 according to various access modes. As described above, CSI 102 may be a 32-bit bus that supports 32-bit, 16-bit and 8-bit access modes. As a result, logic 260 may be programmed to enable a connected CSL 160 to interface with CSI 102 based upon one or more of the supported access modes.

Address decoder 220 includes logic for generating signals ready to be connected to programmable logic for memory reads, memory writes, DMA requests and acknowledges. According to one embodiment, address decoder 220 is used to decode incoming addresses and generate a match signal. According to a further embodiment, address decoder 220 includes high performance address decoding terms that that are distributed throughout CSL 160 in order to simplify CSL 160 logic required to build interface functions. In another embodiment, interface 170 includes a multitude of decoders 220.

Selector 230 decodes bus addresses and command protocols in conjunction with address decoder 220. As a result, it is not necessary to use CSL 160 resources to decode bus transactions. Selector 230 receives the match signal from decoder 220. Logic within selector 230 is used to control the behavior of selector 230 depending upon the type of transaction to be performed. For example, selector 230 may generate a write select or read select.

As described above, the combination of decoder 220 and selector 230 may perform basic chip select (e.g., read/write selects) and address decode functions. However, in further embodiments, decoder 220 and selector 230 may also perform services such as the addition of wait states, control of DMA transactions and coordination of the operation of an external memory bus.

In one embodiment, there is one selector 230 for every decoder 220. Alternatively, two or more selectors may share one address decoder. In another embodiment, there is one decoder 220/selector 230 combination for every sixteen cells in the CSL 160 matrix. As a result, the number of decoders 220 and selectors 230 within interface 170 corresponds with the size of CSL 160. One of ordinary skill in the art will appreciate that other quantities of decoders 220 and selectors 230 may be included in CSL 160.

Configuration memory 240 holds one or more bits of configuration data. The values of the configuration data determine the detailed function of CSL interface 170. According to one embodiment, each bit of the configuration memory 240 is coupled to one or more logic gate inputs in transaction mode logic 260 or address decoder 220. In another embodiment, one or more bits in configuration memory 240 are also coupled to selector 230.

In one embodiment, CSL 160 may be used as a 32-bit register. A register is formed using flip-flop elements within CSL 160, with each one of four 8-bit bytes mapping directly to a fixed location. As a result, a decoder 220/selector 230 combination is used to control each byte.

Figure 3:
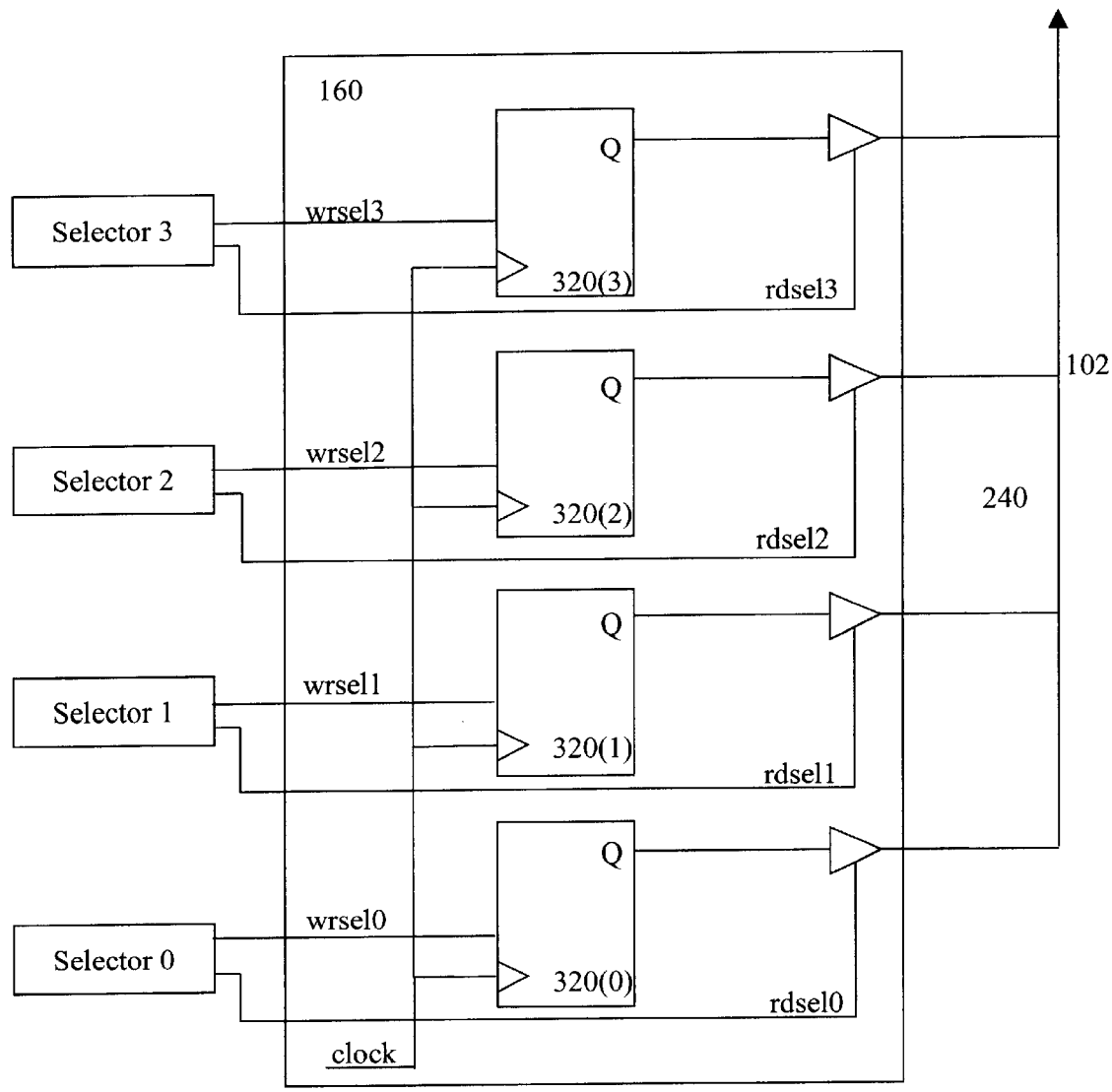
FIG. 3 is a block diagram of one embodiment of an implementation for a configurable system logic.

FIG. 3 is a block diagram of one embodiment of CSL logic 160 configured to implement a 32-bit register. In such an embodiment, CSL logic 160 includes four registers 320. Each register supports an 8-bit section of the 32-bit register. For example, register 320(0) corresponds to bits [0:7], register 320(1) corresponds to bits [8:15], register 320(2) corresponds to bits [16:23] and register 320(3) corresponds to bits [24:31]. In addition, each register is coupled to a selector 230 (e.g., selectors 0–3) that controls the writing and reading of data to and from CSI 102.

Figure 4:
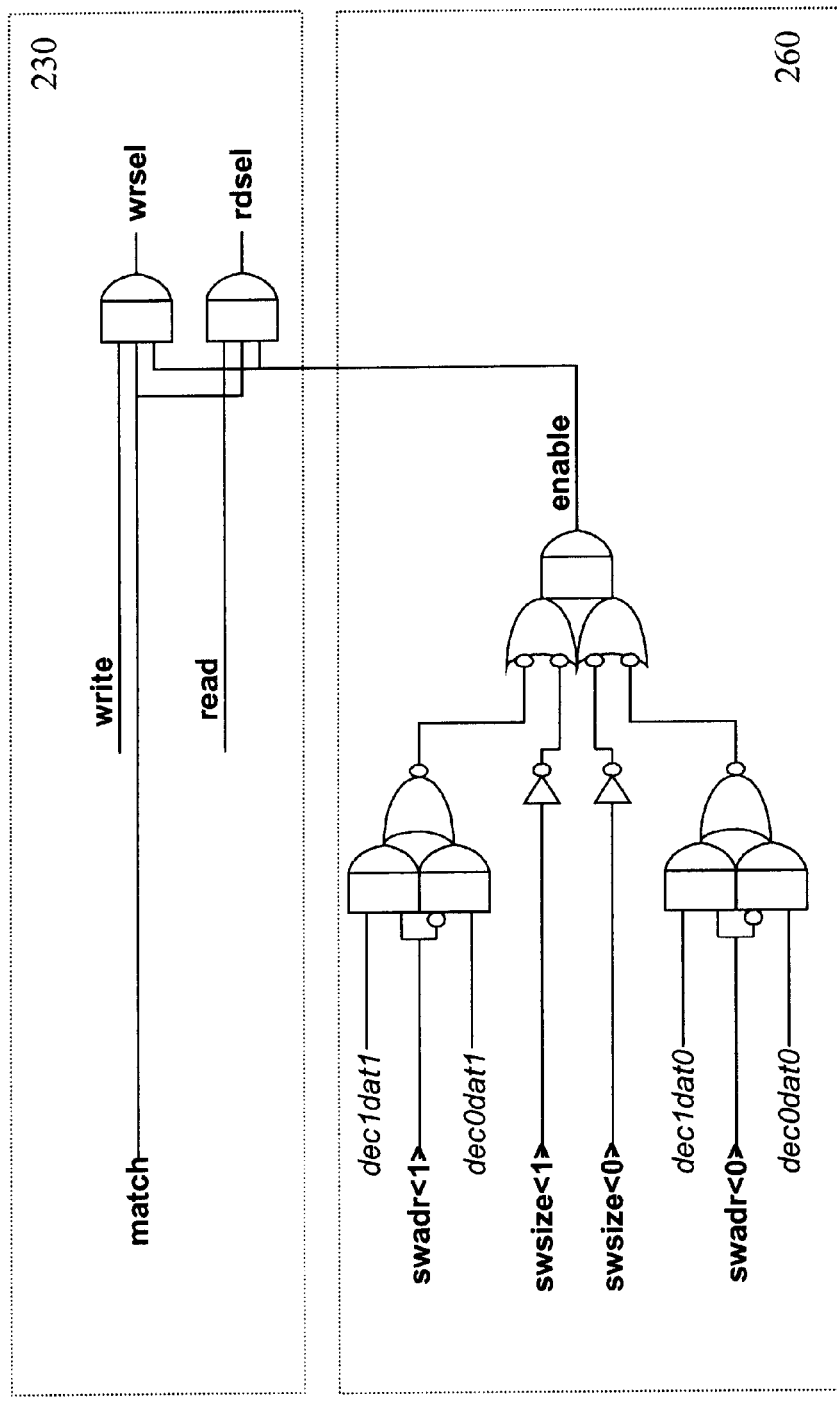
FIG. 4 is a block diagram of one embodiment of selector logic.

FIG. 4 is a block diagram of one embodiment of selector 230 and logic 260. As described above, a write select (wrsel) or a read select (rdsel) is generated for each of the four selectors coupled to a register depending on the type of transaction. As a result, each selector independently controls whether a particular byte of data is received or transmitted. Logic 260 receives four control bits, dec1dat1, dec0dat1, dec1dat0 and dec0dat0 from configuration memory 240. In addition, logic 260 receives Swsize[1:0] and Swaddr[1:0] from CSI 102. Swsize[1:0] represent the size bits that determine the size of a transaction. According to one embodiment, during a 32-bit data transaction, Swsize[1:0]= 11, during a 16-bit data transaction, Swsize[1:0]=01 and during an 8-bit data transaction, Swsize[1:0]=00. Swaddr [1:0] represent the two least significant bits of the address portion of CSI 102 and indicates which of selectors 0–3 is to support a transaction. If CSL160 supports only 32-bit data transactions, the value of Swsize is not used.

According to one embodiment, if a device within CSL160 is designed to support 16-bit data transactions and if Swaddr [1:0]=10, selectors 2 and 3 are used for data transactions. If a device within CSL160 is designed to support,16-bit data transactions and if Swaddr[1:0]=00, selectors 0 and 1 are used for data transactions. Moreover, if a device within CSL160 is designed to support 8-bit data transaction, the binary value of Swsize determines which selector is used for the transaction. For example, if Swaddr[1:0]=00, selector 0 is used for the 8-bit transaction.

Table 1 below illustrates one embodiment of the access types supported by interface 170 for a 32-bit register application.

TABLE 1

| Swaddr [1:0] | Swsize [1:0] | Selector 3 | Selector 2 | Selector 1 | Selector 0 |
|---|---|---|---|---|---|
| 00 | 11 | X | X | X | X |
| 10 | 01 | X | X | | |
| 00 | 01 | | | X | X |
| 11 | 00 | X | | | |
| 10 | 00 | | X | | |
| 01 | 00 | | | X | |
| 00 | 00 | | | | X |

By using the four signals discussed above (e.g., Swsize [1:01] and Swaddr[1:0]), an interface for the 32-bit access modes are defined. For example, when Swaddr[1:0]=10 and Swsize[1:0]=01, CSI 102 is performing a 16-bit data transfer and the data appears on the 2-bytes corresponding to selectors 2 and 3, as designated by "X" in the table. As mentioned above, the access types are programmed into mode logic 260.

Table 2 illustrates one embodiment of control values that may be used to activate each of the four selectors in the 32-bit register implementation. Note that the control values listed in Table 2 are specific to the embodiment described with respect to FIG. 4. One of ordinary skill in the art will appreciate that other control values may be used in other embodiments.

TABLE 2

| Selector | dec1dat1 | dec0dat1 | dec1dat0 | dec0dat0 |
|---|---|---|---|---|
| Selector 3 | 1 | 0 | 1 | 0 |
| Selector 2 | 1 | 0 | 0 | 1 |
| Selector 1 | 0 | 1 | 1 | 0 |
| Selector 0 | 0 | 1 | 0 | 1 |

In another embodiment, CSI 102 supports 16-bit and 8-bit transactions and CSL 160 implements a 16×16 bit RAM using lookup tables (LUTs). Typically, each LUT can implement a 16×1 RAM. Therefore, 16 LUTs are needed in such an embodiment. Table 3 below illustrates one embodiment of the access types supported by interface 170 for a 16×16 bit RAM.

TABLE 3

| Swaddr[1:0] | Swsize[1:0] | Selector 1 | Selector 0 |
|---|---|---|---|
| 00 | 11 | N/A | N/A |
| 10 | 01 | X | X |
| 00 | 01 | X | X |
| 11 | 00 | X | |
| 10 | 00 | | X |
| 01 | 00 | X | |
| 00 | 00 | | X |

By using the four Swsize and Swaddr bits, an interface for the 16-bit access mode for a 16×16 bit RAM is defined. For example, when Swaddr[1:0]=10 and Swsize[1:0]=00, CSI 102 is performing an 8-bit data transfer and is accessing the byte corresponding to selector 0, as designated by "X" in the table. Note that the mode for 32-bit accesses (e.g., Swaddr [1:0]=00 and Swsize[1:0]=11) is not supported. Table 4 illustrates one embodiment of control values that may be used to activate the selectors in the 16×16 bit RAM implementation.

TABLE 4

| Selector | dec1dat1 | dec0dat1 | dec1dat0 | dec0dat0 |
|---|---|---|---|---|
| Sel1 | 1 | 1 | 1 | 0 |
| Sel0 | 1 | 1 | 0 | 1 |

According to one embodiment, each selector has separate wait state generation logic. A wait state may be necessary if a device component within system 100 is too slow to respond in a time allotted for a data transaction. Therefore, the number of cycles in a transaction is extended by adding wait states. If a wait state is required, the appropriate selector 230 is programmed to insert an appropriate number of wait states. In an embodiment where each selector 230 generates a separate wait state, system performance is increased since wait state generation at one selector 230 does not affect the others. For instance, if all four selectors in the 32-bit register illustration share the wait state control, all four bytes will be affected whenever only one byte requires extra wait states. Nevertheless, in other embodiments selectors 230 may share wait state control.

As described above, CSL interface 170 enables an efficient integration between device peripherals within system 100 that have a fixed size interface and a configurable system bus, such as CSI 102, that supports varying transfer sizes. CSL interface 102 helps manage data transfer modes and programmable logic that implements the peripheral devices. As a result, device designers need not be concerned about the complexity of the various transfer combinations. In addition, fewer logic resources are needed by device designers in order to implement a peripheral interface in programmable logic.

In the foregoing specification, the invention has been described with reference to specific exemplary embodiments thereof. It will, however, be evident that various modifications and changes may be made thereto without depending from the broader spirit and scope of the invention as set forth in the appended claims. The specification and drawings are, accordingly, to be regarded in an illustrative rather than a restrictive sense.

What is claimed is:

1. A system comprising:
a system interconnect;
programmable logic; and
interface logic coupled to the system interconnect and the programmable logic, comprising:
a first set of mode logic to enable the interface logic to connect the programmable logic to the system interconnect via a first access mode supported by the system interconnect;
a first address decoder coupled to the first set of mode logic;
a first selector coupled to the first set of mode logic;
a second set of mode logic to connect the programmable logic to the system interconnect via a second access mode supported by the system interconnect;
a second address decoder coupled to the second set of mode logic; and
a second selector coupled to the second set of mode logic.

2. A The system of claim 1 further comprising a configuration memory coupled to the first address decoder and the first set of mode logic.

3. The system of claim 1 wherein the first and second sets of mode logic are programmable.

4. The system of claim 1 wherein the first and second sets of mode logic receive a first configuration signal indicating the access mode in which the programmable logic operates.

5. The system of claim 4 wherein the first and second sets of mode logic receive a second configuration signal indicating which portion of the system interconnect is used in the access mode.

6. The system of claim 5 wherein the first and second sets of mode logic receive a plurality of control signals from the programmable logic.

7. The system of claim 1 wherein the interface logic comprises:
a third set of mode logic to connect the programmable logic to the system interconnect via a third access mode supported by the system interconnect.

8. The system of claim 1 wherein the first selector includes first wait state generation logic and the second selector includes second wait state generation logic.

9. The system of claim 1 wherein the system interconnect is a 32-bit bus adaptable to support 32-bit, 16-bit and 8-bit data transactions.

10. The system of claim 1 further comprising:
a central processing unit (CPU) coupled to the system interconnect;
a random access memory (RAM) coupled to the system interconnect; and
a read only memory (ROM) coupled to the system interconnect, wherein the system interconnect, programmable logic, interface logic, CPU, RAM and ROM are implemented on the same integrated circuit.

11. Interface logic comprising:
a first address decoder;
a first set of mode logic coupled to the address decoder to connect the programmable logic to the system interconnect via a first access mode supported by the system interconnect;
a first selector coupled to the first set of mode logic;
a second set of mode logic to connect the programmable logic to the system interconnect via a second access mode supported by the system interconnect
a second address decoder coupled to the second set of mode logic; and
a second selector coupled to the second set of mode logic.

12. The interface logic of claim 11 wherein the first selector includes first wait state generation logic and the second selector includes second wait state generation logic.

13. The interface logic of claim 12 wherein the first and second sets of mode logic are programmable.

14. The interface logic of claim 12 wherein the first and second sets of mode logic receive a first configuration signal indicating the access mode in which the programmable logic operates.

15. The interface logic of claim 14 wherein the first and second sets of mode logic receive a second configuration signal indicating which portion of the system interconnect is used in the access mode.

16. The interface logic of claim 15 wherein the first and second sets of mode logic receive a plurality of control signals from the programmable logic.

17. The interface logic of claim 11 further comprising a configuration memory coupled to the first address decoder and the first set of mode logic.

18. The interface logic of claim 11 wherein the interface logic comprises:

a third set of mode logic to connect the programmable logic to the system interconnect via a third access mode supported by the system interconnect.

19. A semiconductor device comprising:
a system interconnect;
programmable logic; and interface logic coupled to the system interconnect and the programmable logic; comprising:
a first address decoder;
a first set of mode logic coupled to the first address decoder;
a first selector coupled to the first set of mode logic;
a second address decoder;
a second set of mode logic coupled to the second address decoder; and
a second selector coupled to the second set of mode logic.

20. The system of claim 19 herein the interface logic comprises:
a third address decoder;
a third set of mode logic coupled to the third address decoder; and
a third selector coupled to the third set of mode logic.

* * * * *